United States Patent Office 3,210,391
Patented Oct. 5, 1965

3,210,391
1α-METHYLCORTICOSTEROIDS
Rudolf Wiechert, Berlin-Lichterfelde, and Ulrich Kerb and Klaus Kieslich, Berlin-Charlottenburg, Germany, assignors to Schering A.G., Berlin, Germany
No Drawing. Filed Feb. 27, 1963, Ser. No. 261,478
Claims priority, application Germany, Mar. 31, 1962, Sch 31,227
7 Claims. (Cl. 260—397.45)

The present invention relates to 1α-methylcorticosteroids, to intermediates in the production thereof and to methods of producing the intermediates and the 1α-methylcorticosteroids.

It is an object of the present invention to provide new 1α-methylcorticosteroids.

It is another object of the present invention to provide new intermediates in the production thereof.

It is yet another object of the present invention to provide new 1α-methylcorticosteroids which exhibit excellent anti-inflammatory properties, and to provide for the use of such compounds for such purposes.

It is yet another object of the present invention to provide a method of producing 1α-methylcorticosteroids.

Other objects and advantages of the present invention will be apparent from a further reading of the specification and of the appended claims.

With the above and other objects in view, the present invention mainly comprises a compound of the formula:

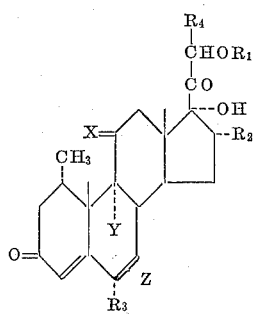

wherein $R_1$ is selected from the group consisting of hydrogen and carboxylic acid acyl radicals, wherein $R_2$ is selected from the group consisting of hydrogen and lower alkyl, wherein $R_3$ is selected from the group consisting of hydrogen, lower alkyl and halogen, wherein $R_4$ is selected from the group consisting of hydrogen and lower alkyl, wherein X is selected from the group consisting of

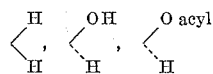

and =O, wherein Y is selected from the group consisting of hydrogen and fluorine, and wherein Z is selected from the group consisting of a double bond between C–6 and C–7 and a saturated linkage between C–6 and C–7.

In U.S. patent application of Rudolf Wiechert, Serial No. 98,026, filed March 24, 1961, for "1α-Methyl Steroids" it has been proposed to convert $\Delta^1$-3-keto androstane compounds, most advantageously by means of methylmagnesium halogenides in the presence of cuprous chloride to the corresponding 1α-methyl-3-ketoandrostanes.

It has now surprisingly been found that the mentioned 1,4-Grignard addition will also take place on those 3-keto steroids which in 17-position contain instead of the 17β-hydroxyl group the corticoid characteristic dioxyacetone side chain in free or functionally altered form. It is possible to produce all of the compounds falling within the above set forth general structural formula by suitable choice of the starting materials and satisfactory combination of per se known reaction steps.

The new 1α-methylcorticosteroids of the present invention, those falling within the above set forth generic structural formula, exhibit excellent anti-inflammatory characteristics, and besides these anti-inflammatory activity posses the advantage that as a result of the 1α-methyl group, even upon administration of high doses the compounds show no sodium retention in the Simpson- and Tait test on rats.

As will be more fully described below, in the production of the anti-inflammatory 1α-methylcorticoid compounds of the present invention there may be first produced as a valuable intermediate a compound of the formula:

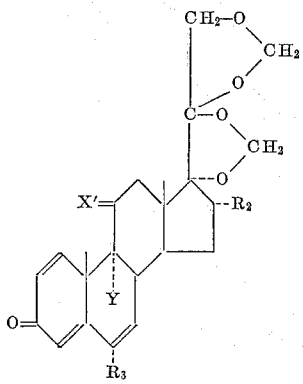

wherein $R_2$, $R_3$ and Y have the same definitions as above and wherein X' is oxygen or

There is also produced as a valuable intermediate compounds of the formula:

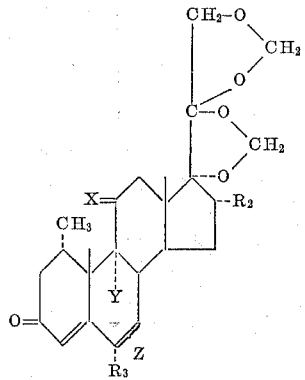

wherein $R_2$, $R_3$, X, Y and Z have the same definitions as above.

The production of the new and useful 1α-methylcorticoids of the present invention proceeds whereby means of reaction steps which are per se known, starting either from a product which already contains an 11-oxygen function, for example $\Delta^{1,4,6}$-pregnatriene-17α,21-diol-3,11,20-trione (I), or starting from a compound which is free of oxygen in the 11-position, such as $\Delta^{1,4,6}$-pregnatriene-17α,21-diol-3,20-dione-21-acetate (VIII).

The following reaction scheme A (starting product compound I) and reaction scheme B (starting product compound VIII) serve to illustrate the means of syntheses for producing the new 1α-methylcorticoids of the present invention.

REACTION SCHEME A

REACTION SCHEME B

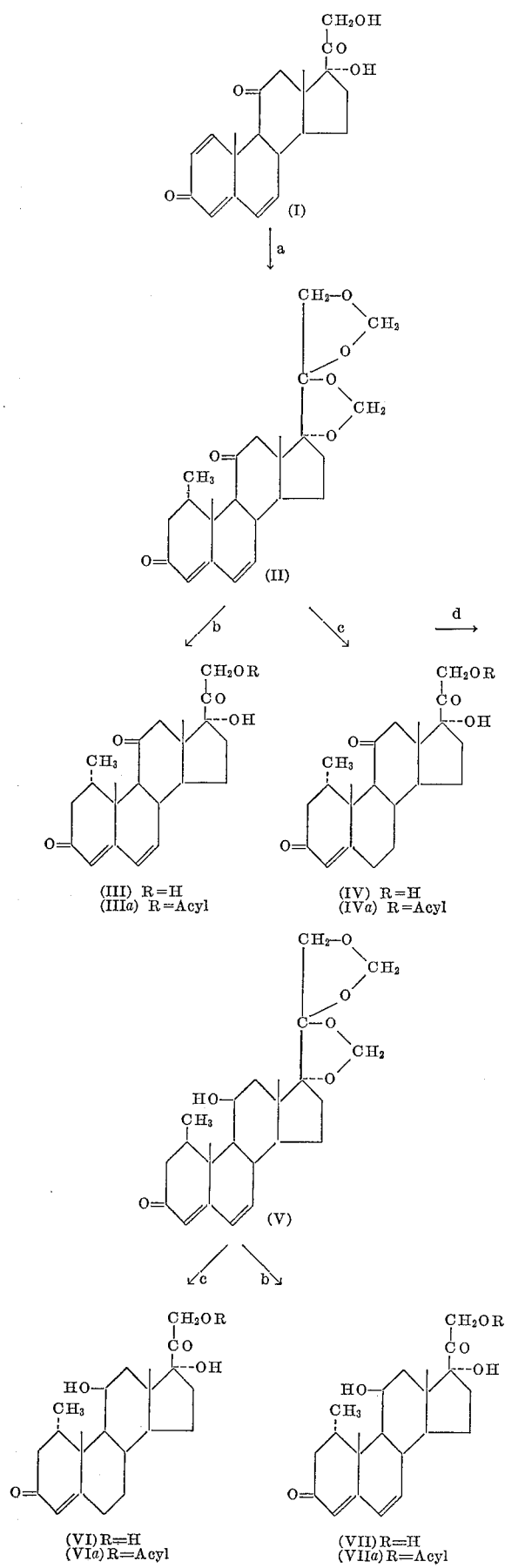

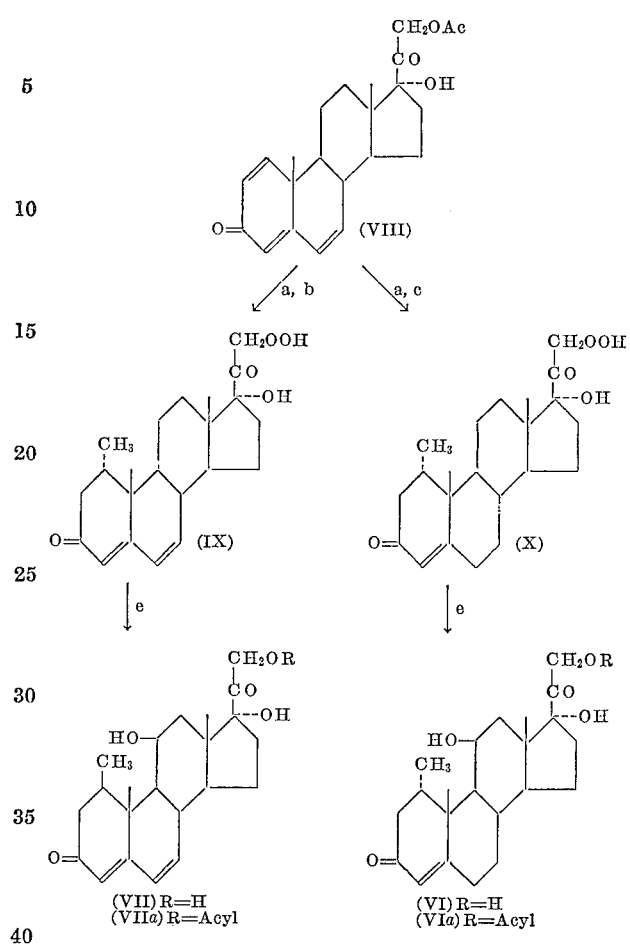

(VII) R=H
(VIIa) R=Acyl (VI) R=H
(VIa) R=Acyl

According to step (a) the Δ[1,4,6]-pregnatriene-17α,21-diol-3,11-20-trione (I), after protection of the dioxyacetone side chain, for example by reaction with formaldehyde to form 17α,20; 20,21-bismethylenedioxide-Δ[1,4,6]-pregnatriene-3,11-dione, the 1α-methyl group is introduced by Grignardation with methylmagnesium halogenide, preferably methylmagnesium iodide, in the presence of cuprous chloride to form the 1α-methyl-17α,20; 20,21 - bismethylenedioxide - Δ[4,6] - pregnadiene - 3,11-dione (II). This compound is then in step (b) by preferably increased temperature by means of a weak acid, for example an organic acid, most preferably with about 60% aqueous formic acid, hydrolyzed to 1α-methyl-Δ[4,6]-pregnadiene-17α,21-diol-3,11,20-trione (III), and if desired, the 21-hydroxyl group is subsequently functionally modified, preferably to the 21-acylate, by esterification with, for example, aliphatic monocarboxylic acids or dicarboxylic acids such as acetic acid, propionic acid, β-cyclopentylpropionic acid, enanthic acid, caproic acid, succinic acid, adipic acid, of such acids as benzoic acid of phenylacetic acid, into compound IIIa. It is possible either before or after the hydrolysis of the bismethylenedioxy side chain to saturate the Δ[6]-double bond, preferably by partial hydrogenation with a palladium catalyst in methanol (step c), and thus, through III or 1α-methyl-17α,20; 20,21-bismethylenedioxide-Δ[4]-pregnene-3,11-dione as intermediate products to obtain 1α-methyl-Δ[4]-pregnene-17α,21-diol-3,11,20-trione (IV) and its fuctionally altered product IVa, preferably the 21-acylate. If desired, the compound II can, by step d, by reduction, preferably with metal hydrides, particularly LiAlH$_4$ in, for example, methanol or tetrahydrofurane, and subsequent partial reoxidation of the also reduced 3-keto group, preferably by means of the Oppenauer method, convert the same to 1α-methyl-17α,20; 20,21-bismethylenedioxide-Δ$^{4,6}$-pregnadiene-11β-ol-3-one (V) and subsequently, according to step b to 1α-methyl-Δ$^{4,6}$-pregnadiene-11β,17α,21-triol-3,20-dione (VIII) or its functionally altered product VIIa, particularly the 21-acylate, or, if desired, according, according to step c through VII or 1α-methyl-17α,20; 20,21-bismethylenedioxide-Δ$^4$-pregnene-11β-ol-3-one into 1α-methyl-Δ$^4$-pregnene-11β,17α,21-triol-3,20-dione (VI) and its functionally altered products VIa, particularly the 21-acylates.

To produce the corresponding 11β-OH-compounds it is particularly advantageous to start from compounds which are free of oxygen in the 11-position, such as Δ$^{1,4,6}$ - pregnatriene - 17α,21 - diol - 3,20 - dione - 21-acetate, and to introduce the 11β-hydroxy group microbiologically as the last synthesis step after methylation and if desired partial hydrogenation of the Δ$^6$-double bond.

After saponification of the 21-acetate group the Δ$^{1,4,6}$-pregnatriene-17α,21-diol-3,20-dione is, in accordance with the above illustrated procedures (a) and (b) converted to 17α,20; 20,21-bismethylenedioxide-Δ$^{1,4,6}$-pregnatriene-3-one and 1α-methyl-17α,20; 20,21-bismethylenedioxide-Δ$^{4,6}$-pregnadiene-3-one and then to 1α-methyl-Δ$^{4,6}$-pregnadiene-17α,21-diol-3,20 dione (IX), or if desired according to method steps (a) and (c) through 1α-methyl-17α,20; 20,21 - bismethylenedioxide - Δ$^4$ - pregnene - 3-one or IX into 1α-methyl-Δ$^4$-pregnene-17α,21-diol-3,20-dione (X). The compound IX or X can be converted to compound VI or VII, respectively, by 11β-hydroxylation by means of microorganisms or their enzymes, preferably by microorganisms of the genus Curvularia, particularly Curvularia lunata, which, if desired, can be further converted to compounds VIa or VIIa, respectively.

As previously indicated, the starting products used in the reaction scheme illustrated above are only model substances used for the purpose of illustrating the synthesis according to the present invention. Quite obviously other starting compounds can be used for the production of useful new 1α-methylcorticoids of the present invention, that is those which fall within the general formula given initially.

Among such starting materials may be mentioned:

(1) 6 - fluoro - Δ$^{1,4,6}$ - pregnatriene - 17α,21 - diol-3,20 - dione (German Auslegeschrift No. 1.092,468 (1959));

(2) 6 - fluoro - Δ$^{1,4,6}$ - pregnatriene - 17α,21 - diol-3,11,20-trione (German Auslegeschrift No. 1,075,114 (1959), German Auslegescrift No. 1,092,486 (1959));

(3) 6,9α - difluoro - Δ$^{1,4,6}$ - pregnatriene - 17α,21-diol-3,11,20-trione (German Auslegeschrift No. 1,092,468 (1959)).

The following examples are given to further illustrate the present invention. The scope of the invention is not, however, meant to be limited to the specific details of the examples.

*Example 1*

17,20; 20,21-BISMETHYLENEDIOXY-Δ$^{1,4,6}$-PREGNATRIENE-3,11-DIONE 9.66 g. of Δ$^{1,4,6}$-pregnatriene-17α,21-diol-3,11,20-trione (produced according to J. Am. Chem. Soc. 79, 502, (1957)), dissolved in 386 cc. of chloroform are stirred at room temperature for 48 hours under nitrogen atmosphere with 96.7 cc. of formalin solution (40%) and 96.7 cc. of concentrated hydrochloric acid. It is subsequently diluted with methylene chloride, washed with water and sodium bicarbonate solution until neutral, and the organic phase after drying over sodium sulfate is filtered. After evaporation of the solvent the residue is recrystallized from ethyl acetate. There is thus obtained 5.8 g. of 17,20; 20,21-bismethylenedioxy-Δ$^{1,4,6}$-pregnatriene-3,11-dione having a melting point of 215.5–217° C.

$\epsilon_{207}=10,200$; $\epsilon_{219}=11,100$; $\epsilon_{254}=10,100$; $\epsilon_{297}=12,400$

*Example 2*

1α-METHYL-17,20; 20,21-BISMETHYLENEDIOXY-Δ$^{4,6}$-PREGNADIENE-3,11-DIONE (II)

3.7 cc. of methyl iodide are slowly added dropwise under nitrogen atmosphere at room temperature and with stirring to 1.347 g. of magnesium shavings and 47 cc. of absolute ether. After about 30 minutes it is diluted with 80 cc. of absolute tetrahydrofuran and subsequently the liquid is distilled off until a boiling point of 62° C. is reached. 270 mg. of cuprous chloride are then added at room temperature to the reaction mixture and thereafter there is added dropwise 5.36 g. of 17,20; 20,21-bismethylenedioxy - Δ$^{1,4,6}$ - pregnatriene - 3,11 - dione dissolved in 135 cc. of tetrahydrofurane. After about 30 minutes of reaction time the reaction mixture is cooled to 0° C., the excess Grignard-reagent is reacted with saturated ammonium chloride solution, and the reaction mixture is then extracted with ether. The separated, ethereal phase is washed successively with aqueous sodium thiosulfate solution, saturated ammonium chloride solution and water, and then after drying over sodium sulfate and filtration concentrated to dryness and the remaining residue filtered over a silica gel column with methylene chloride. After evaporation of the solvent, the crude product obtained from the eluate is recrystallized from isopropyl ether with the addition of methylene chloride, whereby there is obtained 4.2 g. of 1α-methyl - 17,20; 20,21 - bismethylenedioxy - Δ$^{4,6}$ - pregnadiene-3,11-dione having a melting point of 181–183.5° C.

$\epsilon_{282}=25,700$; $[\alpha]_D^{27}=+46.9°$ (c.=0.940)

In all of the examples the specific rotation, unless otherwise indicated, is carried out in chloroform.

*Example 3*

1α-METHYL-Δ$^{4,6}$-PREGNADIENE-17α,21-DIOL-3,11,20-TRIONE (III)

2 g. of 1α-methyl-17,20; 20,21-bismethylenedioxy-Δ$^{4,6}$-pregnadiene-3,11-dione are heated on a steam bath for 2 hours in 100 cc. of about 60% formic acid. It is then diluated with sodium chloride solution, extracted with methylene chloride, the separated organic phase is washed until neutral, dried over sodium sulfate, filtered, and the solution is evaporated to dryness. The crude 1α-methyl-Δ$^{4,6}$ - pregnadiene - 17α,21 - diol - 3,11,20-trione (1.7 g.) melts, after rubbing with isopropyl ether, at 215–218° C., and after recrystallization from ethyl acetate at 218–220° C.

$\epsilon_{283}=25,100$; $[\alpha]_D^{25}=+207°$ (c.=0.57)

*Example 4*

1α-METHYL-Δ$^{4,6}$-PREGNADIENE-17α,21-DIOL-3,11,20-TRIONE-21-ACETATE (IIIa)

1.7 g. of 1α-methyl-Δ$^6$-cortisone in 5 cc. of absolute pyridine are reacted at room temperature for 16 hours with 2.5 cc. of acetic acid anhydride. The reaction mixture is then introduced into ice water, the falling precipitate is filtered off under suction, dried and recrystallized twice from ethyl acetate. There is thus obtained 686 mg. of 1α-methyl-Δ$^{4,6}$-pregnadiene-17α,21-diol-3,11,20-trione-21-acetate having a melting point of 231–233.5° C.

$\epsilon_{281}=25,600$; $[\alpha]_D^{27}=+213°$ (c.=0.855)

*Example 5*

1α-METHYL-17,20; 20,21-BISMETHYLENEDIOXY-Δ$^{4,6}$-PREGNADIENE-11β-OL-3-ONE (V)

6 g. of 1α-methyl-17,20; 20,21-bismethylenedioxy-Δ$^{4,6}$-pregnadiene-3,11-dione in 654 cc. of absolute tetrahydrofurane are reduced under a nitrogen atmosphere for 2 hours under refluxing with 8.76 g. of lithium aluminum hydride. The reaction mixture is then poured into ice water, acidified with sulfuric acid, extracted with methylene chloride, the methylene chloride phase is washed with water until neutral, dried over sodium sulfate, filtered and concentrated under vacuum to dryness. 2 g. of the resulting crude 3,11β-diol are dissolved in 98 cc. of absolute toluene in the presence of 11 cc. of cyclohexanone. A small amount of the solvent is distilled off, a solution of 1.065 g. of aluminum isopropylate in 11 cc. of toluene is slowly added dropwise and under slow distillation heated for an additional hour. The cooled oxidation mixture is subsequently extracted with benzene, washed with sulfuric acid and water until neutral, and the organic phase is subjected to steam distillation. The oxidation product is taken up in methylene chloride, after drying the solution over sodium sulfate and filtration the solution is concentrated to dryness, the thus obtained residue is subjected to chromatography on silica gel, whereby it is eluated with chloroform/methylene chloride 1:1. The isolated crude product is then recrystallized from isopropyl ether and there is thus obtained 534 mg. of 1α-methyl-17,20; 20,21-bismethylenedioxy-Δ$^{4,6}$-pregnadiene-11β-ol-3-one having a melting point of 216–217.5° C.

$\epsilon_{288}=23,800$; $[\alpha]_D^{27}=-35.8°$ (c.=0.921)

Example 6

1α-METHYL-Δ$^{4,6}$-PREGNADIENE-11β,17α,21-TRIOL-3,20-DIONE (VII)

1.99 g. of 1α-methyl-17,20; 20,21-bismethylenedioxy-Δ$^{4,6}$-pregnadiene-11β-ol-3-one are heated in 150 cc. of 50% acetic acid for 7 hours on a steam bath and then mixed with concentrated sodium chloride solution. After subsequent extraction with methylene chloride, washing of the organic phase with water, drying over sodium sulfate, filtration, concentration under vacuum to dryness, the residue is recrystallized from ethyl acetate. There is thus obtained 591 mg. of 1α-methyl-Δ$^{4,6}$-pregnadiene-11β-17α,21-triol-3-,20-dione having a melting point of 234–236° C.

$\epsilon_{287}=25,450$, $[\alpha]_D^{27}=+113°$ (c.=0.31 methanol)

Example 7

1α-METHYL-Δ$^{4,6}$-PREGNADIENE-11β,17α,21-TRIOL-3,20-DIONE-21-ACETATE (VIIa)

340 mg. of 1α-methyl-Δ$^{4,6}$-pregnadiene-11β,17α,21-triol-3,20-dione are recated in pyridine with acetic acid anhydride analogously to Example 4 and further worked up. After recrystallization from ethyl acetate there is thus obtained 180 mg. of 1α-methyl-Δ$^{4,6}$-pregnadiene-11β,17α,21-triol-3,20-dione-21-acetate having a melting point of 209–211° C.

$\epsilon_{287}=26,150$; $[\alpha]_D^{27}=+141°$ (c.=0.915)

Example 8

1α-METHYL-17,20; 20,21-BISMETHYLENEDIOXY-Δ$^4$-PREGNENE-11β-OL-3-ONE 3.14 g. of 1α-methyl-17,20; 20,21-bismethylenedioxy-Δ$^{4,6}$-pregnadiene-11β-ol-3-one dissolved in 150 cc. of methanol are hydrogenated in the presence of 226 mg. of palladium on calcium carbonate (10%) until one equivalent of hydrogen is taken up. After filtering off the catalyst and evaporation of the solution until dryness the residue is subjected to chromatography over silica gel (eluation agent: methylene chloride). After recrystallization of the isolated crude product from methanol there is obtained 2.3 g. of 1α-methyl-17,20; 20,21-bismethylenedioxy-Δ$^4$-pregnene-11β-ol-3-one having a melting point of 201–202° C.

$\epsilon_{244}=13,400$

Example 9

1α-METHYL-Δ$^4$-PREGNENE-11β,17α,21-TRIOL-3,20-DIONE (VI)

1.59 g. of 1α-methyl-17,20; 20,21-bismethylenedioxy-Δ$^4$-pregnene-11β-ol-3-one in 119 cc. of 50% acetic acid are heated for 7 hours at 100° C., worked up analogously to Example 3, and the isolated residue recrystallized from ethyl acetate. There is thus obtained 750 mg. of 1α-methyl-Δ$^4$-pregnene-11β,17α,21-triol-3,20-dione having a melting point of 237–240° C.

$\epsilon_{244}=14,000$; $[\alpha]_D^{22}=+182°$ (c.=0.890)

Example 10

1α-METHYL-Δ$^4$-PREGNENE-11β,17α,21-TRIOL-3,20-DIONE-21-ACETATE (VIa)

1α-methyl - Δ$^4$ - pregnene-11β,17α,21-triol-3,20-dione are acetylated analogously to Example 7 and worked up in the same manner. After recrystallization of the isolated crude product from ethyl acetate there is obtained 300 mg. of 1α-methyl-Δ$^4$-pregnene-11β,17α,21-triol-3,20-dione-21-acetate having a melting point of 228–230° C.

$\epsilon_{245}=14,400$; $[\alpha]_D^{22}=+196°$ (c.=0.510)

Example 11

1α-METHYL-17,20; 20,21-BISMETHYLENEDIOXY-Δ$^4$-3,11-DIONE 414 mg. of 1α-methyl-17,20; 20,21-bismethylenedioxy-Δ$^{4,6}$-pregnadiene-3,11-dione are hydrogenated analogously to Example 8, further worked up and subjected to chromatography in the same manner. After recrystallization of the isolated crude product from isopropyl ether/methylene-chloride there is obtained 705 mg. of 1α-methyl-17,20; 20,21-bismethylenedioxy-Δ$^4$-pregnene - 3, 11-dione having a melting point of 218.5–219.5° C.

$\epsilon_{240}=14,500$; $[\alpha]_D^{27}=+39°$ (c.=0.770)

Example 12

1α-METHYL-Δ$^4$-PREGNENE-17α,21-DIOL-3,11,20-TRIONE (IV)

400 mg. of 1α-methyl-17,20; 20,21-bismethylenedioxy-Δ$^4$-pregnene-3,11-dione are hydrolyzed and worked up with 60% formic acid analogously to Example 3. After recrystallization of the isolated crude product from ethyl acetate there is obtained 52 mg. of 1α-methyl-Δ$^4$-pregnene-17α,21-diol-3,11,20-trione having a melting point of 242–244° C.

$\epsilon_{240}=13,500$

Example 13

1α-METHYL-17,20; 20,21-BISMETHYLENEDIOXY-Δ$^4$-PREGNENE-11β-OL-3-ONE 1.5 g. of 1α-methyl-17,20; 20,21-bismethylenedioxy-Δ$^4$-pregnene-3,11-dione are reacted and worked up analogously to Example 5. After rubbing of the isolated crude product with isopropyl ether there is obtained 171 mg. of 1α-methyl-17,20; 20,21-bismethylenedioxy-Δ$^4$-pregnene-11β-ol-3-one having a melting point of 198–202° C.

Example 14

17,20; 20,21-BISMETHYLENEDIOXY-Δ$^{1,4,6}$-PREGNATRIENE-3-ONE 40 g. of Δ$^{1,4,6}$-pregnatriene-17α,21-diol-3,20-dione-21-acetate are dissolved in 160 cc. of methylene chloride and 160 cc. of methanol, mixed at about 0–5° C. with a solution of 2.4 g. of potassium hydroxide in 80 cc. of methanol, and stirred for about 80 minutes. After the addition of 10 cc. of glacial acetic acid the reaction mixture is stirred into ice water, extracted with methylene chloride, washed until neutral, and the separated organic phase after drying over sodium sulfate and filtration is evaporated to dryness. The remaining residue is dissolved in 3 liters of chloroform, mixed with a mixture of 1 liter of formalin and 1 liter of concentrated hydrochloric acid and stirred for 15 hours at 20° C. The aqueous phase is separated and extracted with chloroform. The purified chloroform extract is washed until neutral, dried, filtered and evaporated to dryness. After recrystallization from ethyl acetate there is obtained 28.8 g. (72% of the theoretical) of 17,20; 20,21-bismethylenedioxy-Δ$^{1,4,6}$-pregnatriene-3-one having a melting point of 183–184.5° C.

$\epsilon_{222}=11,400$; $\epsilon_{254}=9,800$; $\epsilon_{300}=12,200$

Example 15
1α-METHYL-17,20; 20,21-BISMETHYLENEDIOXY-Δ⁴,⁶-PREGNADIENE-3-ONE

A Grignard solution of 7.8 g. of magnesium shavings, 31.4 cc. of methyl iodide and 780 cc. of absolute ether are diluted with 800 cc. of absolute tetrahydrofurane and then the solvent is distilled off until a boiling point of 62° C. is achieved. The solution is subsequently cooled to about 20° C., 4 g. of cuprous chloride are added and 30 g. of 17,20; 20,21-bismethylenedioxy-Δ¹,⁴,⁶-pregnatriene-3-one dissolved in 197 cc. of absolute tetrahydrofurane are added dropwise. After about 30 minutes of additional stirring the reaction mixture is cooled to about 0° C. and the excess Grignard reagent reacted with saturated ammonium chloride solution. The separated organic phase is washed with water, dried, filtered and evaporated to dryness. The isolated residue is recrystallized from isopropyl ether/methylene chloride. There is thus obtained 20.6 g. (66% of the theoretical) of 1α-methyl-17,20; 20,21-bismethylenedioxy-Δ⁴,⁶-pregnadiene-3-one having a melting point of 222.5–225.5° C.

$\epsilon_{286} = 25,300$

Example 16
1α-METHYL-17,20; 20,21-BISMETHYLENEDIOXY-Δ⁴-PREGNENE-3-ONE 10 g. of 1α-methyl-17,20; 20,21-bismethylenedioxy-Δ⁴,⁶-pregnadiene-3-one are dissolved in 500 cc. of dimethyl-formamide and in the presence of 780 mg. of palladium on calcium carbonate (10%) hydrogenated until one equivalent of hydrogen is taken up. The catalyst is filtered off, the dimethyl-formamide is distilled off under vacuum and the residue is recrystallized from isopropyl ether/methylene-chloride. There is thus obtained 7.9 g. of 1α-methyl-17,20; 20,21-bismethylenedioxy-Δ⁴-pregnene-3-one having a melting point of 210–212° C.

$\epsilon_{243} = 14,550$

Example 17
1α-METHYL-Δ⁴-PREGNENE-17α,21-DIOL-3,20-DIONE (X)

27.6 g. of 1α-methyl-17,20; 20,21-bismethylenedioxy-Δ⁴-pregnene-3-one are dissolved in 200 cc. of 100% formic acid and heated on a steam bath for about 15 minutes. After cooling the reaction mixture is stirred into ice water, the formed precipitate is filtered off under suction, washed and dried under vacuum at 60° C. The crude formiate is dissolved in 110 cc. of methylene chloride and 110 cc. of methanol, mixed at 0–5° C. with a solution of 1.65 g. of potassium hydroxide and methanol and stirred for about 80 minutes. The saponification solution is subsequently, after the addition of 8 cc. of glacial acetic acid, stirred into ice water, extracted with methylene chloride, the separated organic phase is washed with water, dried, filtered and concentrated to dryness. After recrystallization of the isolated residue from ethyl acetate/methylene chloride there is obtained 13.4 g. of 1α-methyl-Δ⁴-pregnene-17α,21-diol-3,20-dione having a melting point of 220° C. (with decomposition).

$\epsilon_{244} = 14,600$

Example 18
1α-METHYL-Δ⁴,⁶-PREGNADIENE-17α,21-DIOL-3,20-DIONE (IX)

5 g. of 17,20; 20,21-bismethylenedioxy-1α-methyl-Δ⁴,⁶-pregnadiene-3-one are hydrolyzed and worked up analogously to Example 3. There is obtained from the isolated crude product from isopropyl ether/methylene chloride in 50% yield 1α-methyl-Δ⁴,⁶-pregnadiene-17α,21-diol-3,20-dione having a melting point of 223–224° C.

$\epsilon_{287} = 26,600$

Example 19
BIS-(1α-METHYL-HYDROCORTISONE-21)-ADIPIC ACID ESTER

A solution of 1 g. of 1α-methyl-hydrocortisone in 10 cc. of pyridine is mixed with 0.3 g. of adipic acid dichloride and stirred for 5 hours at room temperature. The reaction mixture is subsequently poured into ice water, extracted with methylene chloride and the methylene chloride phase is further worked up in normal manner. After recrystallization of the isolated residue from isopropyl ether/methylene chloride there is obtained 1.0 g. of bis-(1α-methyl-hydrocortisone-21)-adipic acid ester having a melting point of 154° C. (with decomposition).

$\epsilon_{245} = 28,850$

Example 20
1α-METHYL-Δ⁴-PREGNENE-11β,17α,21-TRIOL-3,20-DIONE

A fermenter of stainless steel having a 50 liter capacity is charged with 30 liters of a nutrient solution of:

|  | Percent |
|---|---|
| Glucose (starch sugar) | 4.4 |
| Malt extract | 1.0 |
| $NaNO_3$ | 0.3 |
| $KH_2PO_4$ | 0.1 |
| KCl | 0.05 |
| $MgSO_4$ | 0.05 |
| $FeSO_4$ | 0.002 |
| Corn steep | 0.5 |

The nutrient solution is sterilized by heating for one half hour at 120° C., and after cooling is innoculated with a spore suspension of *Curvularia lunata*, which is obtained by rinsing a 7-day corn culture (15 g. corn) with about 100 cc. of physiological saline solution.

After two days of propagation at 25° C. under stirring (220 revolutions per minute) and aeration (1.65 m.³/h.), 1.8 liters of the produced culture is removed under sterile conditions and transferred into a fermenter of the same size charged with 28.2 liters of a nutrient solution of:

|  | Percent |
|---|---|
| Glucose (starch sugar) | 4.4 |
| Malt extract | 1.0 |
| $NaNO_3$ | 0.3 |
| $KH_2PO_4$ | 0.1 |

After 24 hours of cultivation under stirring and aeration as described above, 7.5 g. of 1α-methyl-Δ⁴-pregnene-17α,21-diol-3,20-dione in 200 cc. of ethanol are added and the fermentation is continued for 28 hours under the same conditions.

The course of the fermentation is tested by removal of test samples which are extracted with methyl isobutyl ketone. The extracts are analyzed by paper chromatography in a system of dioxane plus toluene/propylene glycol.

After the end of the fermentation (28 hours), the cultured broth is filtered off under suction over a large suction filter. The mycelium residue is washed with water several times. The filtrate is extracted three times, each time with 10 liters of methyl isobutyl ketone. The extract is concentrated under vacuum in a rotating vaporizer, and carefully evaporated to dryness under vacuum in a round bottom flask. After recrystallization of the residue from ethyl acetate there is finally obtained 1α-methyl-Δ⁴-pregnene-11β,17α-21-triol-3,20-dione having a melting point of 243–245° C.

$\epsilon_{244} = 15,100$; $[\alpha]_D +196°$

Example 21
1α-METHYL-Δ⁴,⁶-PREGNADIENE-11β,17α,21-TRIOL-3,20-DIONE 7.5 g. of 1α-methyl-Δ⁴,⁶-pregnadiene-17α,21-diol-3,20-dione are fermented for 36 hours analogously to Example 20 with *Curvularia lunata* and the reaction mixture is further worked up in the same manner. There is thus obtained a crystalline crude product, which are recrystallization from ethyl acetate results in 1α-methyl-Δ⁴,⁶-pregnadiene-11β,17α,21-triol-3,20-dione having a melting point of 234–236° C.

Example 22

17,20; 20,21-BISMETHYLENEDIOXY-9α-FLUORO-Δ¹,⁴,⁶-PREGNATRIENE-3,11-DIONE

13 g. of 9α-fluoro-Δ¹,⁴,⁶-pregnatriene-17α,21-diol-3,11,20-trione [produced according to German Auslegeschrift No. 1,063,163 (1959), C.A. 5581 (1960)] dissolved in 520 cc. of chloroform are stirred at room temperature for 48 hours under nitrogen with 130 cc. of 40% formalin solution and 130 cc. of concentrated hydrochloric acid. The further working up proceeds as in Example 1. After recrystallization of the isolated crude product from methanol there is obtain 7.2 g. of 17,20; 20,21-bismethylenedioxy-9α fluoro-Δ¹,⁴,⁶-pregnatriene-3,11-dione having a melting point of 287–288° C. (with decomposition).

UV: $\epsilon_{207}=8210$; $\epsilon_{219}=10,100$; $\epsilon_{249}=9270$; $\epsilon_{295}=11,670$

Example 23

1α-METHYL-9α-FLUORO-17,20; 20,21-BISMETHYLENEDIOXY-Δ⁴,⁶-PREGNADIENE-3,11-DIONE

405 cc. of absolute tetrahydrofurane are added to a Grignard solution produced from 6.07 g. of magnesium shavings and 33.4 cc. of methyl iodide in 172 cc. of absolute ether. The liquid is subsequently distilled off until a boiling point of 62° C. is obtained. At room temperature there is then added 405 mg. of cuprous chloride, and thereafter a solution of 8.42 g. of 17,20; 20,21-bismethylenedioxy-9α-fluoro-Δ¹,⁴,⁶-pregnatriene-3,11-dione in 280 cc. of absolute tetrahydrofurane. After 10 minutes the further working up proceeds as described in Example 2.

The obtained crude product is subjected to chromatography over silica gel wtih methylene chloride/carbon tetrachloride (2:1). There is obtained after recrystallization from isopropyl ether/methylene chloride 2.24 g. of 1α-methyl-9α-fluoro-17,20; 20,21-bismethylenedioxy-Δ⁴,⁶-pregnadiene-3,11-dione having a melting point of 227–228° C.

UV: $\epsilon_{279}=24,500$

Example 24

1α-METHYL-9α-FLUORO-Δ⁴,⁶-PREGNADIENE-17α,21-DIOL-3,11,20-TRIONE

200 mg. of 1α-methyl-9α-fluoro-17,20; 20,21- bismethylenedioxy-Δ⁴,⁶-pregnadiene3,11-dione are heated for 2 hours on a steam bath with 10 cc. of 60% formic acid.

The reaction mixture is then further worked up as described in Example 3. After recrystallization from ethyl acetate there is obtained 1α-methyl-9α-fluoro-Δ⁴,⁶-pregnadiene-17α,21-diol-3,11,20-trione melting at 240.5–242.5° C. The yield amounts to 45 mg.

UV: $\epsilon_{277}=25,400$

Example 25

1α-METHYL-9α-FLUORO-Δ⁴,⁶-PREGNADIENE-17α,21-DIOL-3,11,20-TRIONE-21-ACETATE

200 mg. of 1α-methyl-9α-fluoro-Δ⁴,⁶ pregnadiene-17α,21-diol-3,11,20-trione are stored at room temperature for 16 hours with 0.8 cc. of absolute pyridine and 0.4 cc. of acetanhydride. The reaction mixture is then stirred into ice water, the precipitated product is filtered off under suction, dried and recrystallized from methanol. There is thus obtained 127 mg. of 1α-methyl-9α-fluoro-Δ⁴,⁶-pregnadiene-17α-21-diol-3,11,20-trione-21-acetate having a melting point of 224–226.5° C.

UV: $\epsilon_{278}=25,300$

Example 26

16α-METHYL-9α-FLUORO-17,20; 20,21-BISMETHYLENEDIOXY-Δ¹,⁴-PREGNADIENE-3,11-DIONE

37.32 g. of 16α - methyl - 9α - fluoro - 17,20; 20,21-bismethylenedioxy - Δ¹,⁴ - pregnadiene-11β-ol-3-one [J. Org. Chem. 26, 2421 (1951)] in 2.28 liters of acetone are mixed at 40° C. with a solution of 57 cc. of chromic acid solution (chromic acid solution: 267 g. chromium trioxide, 230 cc. of concentrated sulfuric acid, 400 cc. of water, diluted to 1 liter). The reaction mixture is stirred for 15 minutes then stirred into ice water. The precipitated product is filtered off under suction, washed, dried and recrystallized from methanol/methylene chloride. There is thus obtained 35.79 g. of 16α-methyl-9α-fluoro-17,20; 20,21 - bismethylenedioxy-Δ¹,⁴-pregnadiene-3,11-dione having a melting point of 204–206.5° C.

UV: $\epsilon_{236}=15,700$

Example 27

16α-METHYL-9α-FLUORO-17,20; 20,21-BISMETHYLENEDIOXY-Δ¹,⁴,⁶-PREGNATRIENE-3,11-DIONE

6.85 g. of 16α-methyl-9α-fluoro-17,20; 20,21-bismethylenedioxy-Δ¹,⁴-pregnadiene-3,11-dione in 790 cc. of absolute carbon tetrachloride with 2.82 g. of N-bromo succinimide and 209 mg. of dibenzoyl peroxide are heated under refluxing for 1 hour. The reaction mixture is cooled and diluted with methylene chloride. After washing with water until neutral and drying, the organic phase is evaporated to dryness and the residue is stirred for 16 hours under nitrogen atmosphere at 100° C. in the presence of 4.12 g. of lithium bromide and 3.51 g. of lithium carbonate in 79 cc. of dimethyl formamide. The filtered solution is subsequently stirred into ice water and extracted with methylene chloride. The methylene chloride phase is washed with water until neutral and after drying over sodium sulfate evaporated to dryness. After recrystallization of the residue from methanol there is obtained 4.45 g. of 16α-methyl-9α-fluoro-17,20; 20,21-bismethylenedioxy-Δ¹,⁴,⁶-pregnatriene-3,11-dione having a melting point of 297–298.5° C.

Example 28

1α-16α-DIMETHYL-9α-FLUORO-17,20; 20,21-BISMETHYLENEDIOXY-Δ⁴,⁶-PREGNADIENE-3,11-DIONE

608 cc. of absolute tetrahydrofurane are added to a Grignard solution produced from 10.13 g. of magnesium shavings and 55.7 cc. of methyl iodide in 304 cc. of absolute ether. Liquid is subsequently distilled off until a boiling point of 62° C. is obtained. 675 mg. of cuprous chloride and then a solution of 14.53 g. of 16α-methyl-9α - fluoro - 17,20; 20,21 - bismethylenedioxy - Δ¹,⁴,⁶-pregnatriene-3,11-dione in about 500 cc. of absolute tetrahydrofurane are added at room temperature. After about 10 minutes, the further working up proceeds as in Example 2, and chromatography is carried out over silica gel with methylene chloride/carbon tetrachloride (1:1). From the thus isolated crude product there is obtained after recrystallization from methyl acetate/isopropyl ether, 320 mg. of 1α,16α-dimethyl-9α-fluoro-17,20; 20,21-bismethylenedioxy-Δ⁴,⁶-pregnadiene-3,11-dione having a melting point of 223–225° C.

UV: $\epsilon_{279}=24,300$

Example 29

1α,16α-DIMETHYL-9α-FLUORO-Δ⁴,⁶-PREGNADIENE-17α,21-DIOL-3,11,20-TRIONE

890 mg. of 1α,16α-dimethyl-9α-fluoro-17,20; 20,21-bismethylenedioxy-Δ⁴,⁶-pregnadiene-3,11-dione are heated for 30 minutes on a steam bath in 44.5 cc. of 98 to 100% formic acid. The reaction mixture is then diluted with water, extracted with chloroform, washed with water and sodium bicarbonate solution until neutral, and after drying over sodium sulfate concentrated to dryness. The residue (21-formiate) is recrystallized from methanol. The yield is 630 mg., and the melting point is 255–257° C.

630 mg. of the 21-formiate are stirred with 39.5 mg. of potassium hydroxide in 12.8 cc. of methanol and 10.8 cc. of methylenechloride for 80 minutes at 0° C. The reaction mixture is thereafter diluted with water, extracted with methylene chloride, washed with water until neutral, and after drying over sodium sulfate concentrated to dryness. The residue is recrystallized from methyl acetate/isopropyl ether. There is thus obtained 415 mg. of 1α,16α-dimethyl-9α-fluoro-Δ⁴,⁶-pregnadiene-17α,21-diol-3,11,20-trione having a melting point of 210.5–213° C.

UV: $\epsilon_{278}=24,800$

Example 30

1α,16α-DIMETHYL-9α-FLUORO-Δ⁴,⁶-PREGNADIENE-17α,21-DIOL-3,11,20-TRIONE-21-ACETATE 185 mg. of 1α,16α-dimethyl-9α-fluoro-Δ⁴,⁶-pregnadiene-17α,21-diol-3,11,20-trione are treated and worked up analogously to Example 25 with 0.8 cc. of absolute pyridine and 0.4 cc. of acetanhydride. The crude product is recrystallized from methanol and there is thus obtained 150 mg. of 1α,16α-dimethyl-9α-fluoro-Δ⁴,⁶-pregnadiene-17α,21-diol-3,11,20-trione - 21 - acetate having a melting point of 222–224° C.

UV: $\epsilon_{279} = 25,300$

As indicated above the examples given are for illustrative purposes only, and proceeding analogously to the examples from corresponding starting materials there is produced:

(1) 1α-methyl-9α-fluoro-hydrocortisone and its 21-esters.
(2) 1α-methyl-9α-fluoro-cortisone and its 21-esters.
(3) 1α,16α-dimethyl-9α-fluoro-hydrocortisone and its 21-esters.
(4) 1α,16α-dimethyl-9α-fluoro-cortisone and its 21-esters.
(5) 1α-methyl - 9α - fluoro-Δ⁴,⁶-pregnadiene - 11β,17α-21-triol-3,20-dione and its 21-esters.
(6) 1α-methyl-6α-fluoro-hydrocortisone and its 21-esters.
(7) 1α-methyl-6α-fluoro-cortisone and its 21-esters.
(8) 1α-methyl-6α,9α-difluoro - hydrocortisone and its 21-esters.
(9) 1α-methyl-6α,9α-difluoro-cortisone and its 21-esters.
(10) 1α,16α - dimethyl - 9α - fluoro - Δ⁴,⁶-pregnadiene-11β,17α,21-triol-3,20-dione and its 21-esters.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. 1α - methyl - 9α - fluoro-Δ⁴,⁶-pregnadiene-17α,21-diol-3,11,20-trione.
2. A 21-carboxylic acid ester of 1α-methyl-9α-fluoro-Δ⁴,⁶-pregnadiene-17α,21-diol-3,11,20-trione.
3. 1α,16α - dimethyl-9α-fluoro-Δ⁴,⁶-pregnadiene-17α,21-diol-3,11,20-trione.
4. A 21-carboxylic acid ester of 1α,16α-dimethyl-9α-fluoro-Δ⁴,⁶-pregnadiene-17α,21-diol-3,11,20-trione.
5. 1α,16α - dimethyl - 9α - fluoro - Δ⁴,⁶ - pregnadiene-11β,17α,21-triol-3,20-dione.
6. A 21-carboxylic acid ester of 1α,16α-dimethyl-9α-fluoro-Δ⁴,⁶-pregnadiene-11β,17α,21-triol-3,20-dione.
7. A compound of the formula:

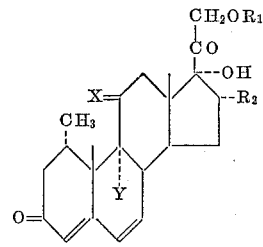

wherein $R_1$ is selected from the group consisting of hydrogen and carboxylic acid acyl radicals; wherein $R_2$ is selected from the group consisting of hydrogen and lower alkyl; wherein X is selected from the group consisting of

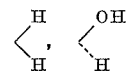

and =O; and wherein Y is fluorine.

References Cited by the Examiner

UNITED STATES PATENTS 2,879,279 3/59 Van Der Burg _____ 260—397.3
3,055,922 9/62 Levinson _____ 260—397.45

OTHER REFERENCES

Agnello et al.: "J.A.C.S." (1960), page 4297 relied on.
"Steroids," by Fieser et al. (1959), Reinhold Publishing Corp., New York, pages 682–683 relied on.

LEWIS GOTTS, *Primary Examiner.*